Aug. 1, 1939.  H. LAFLECHE  2,167,953
TRANSMISSION MECHANISM
Filed July 27, 1937  2 Sheets-Sheet 2
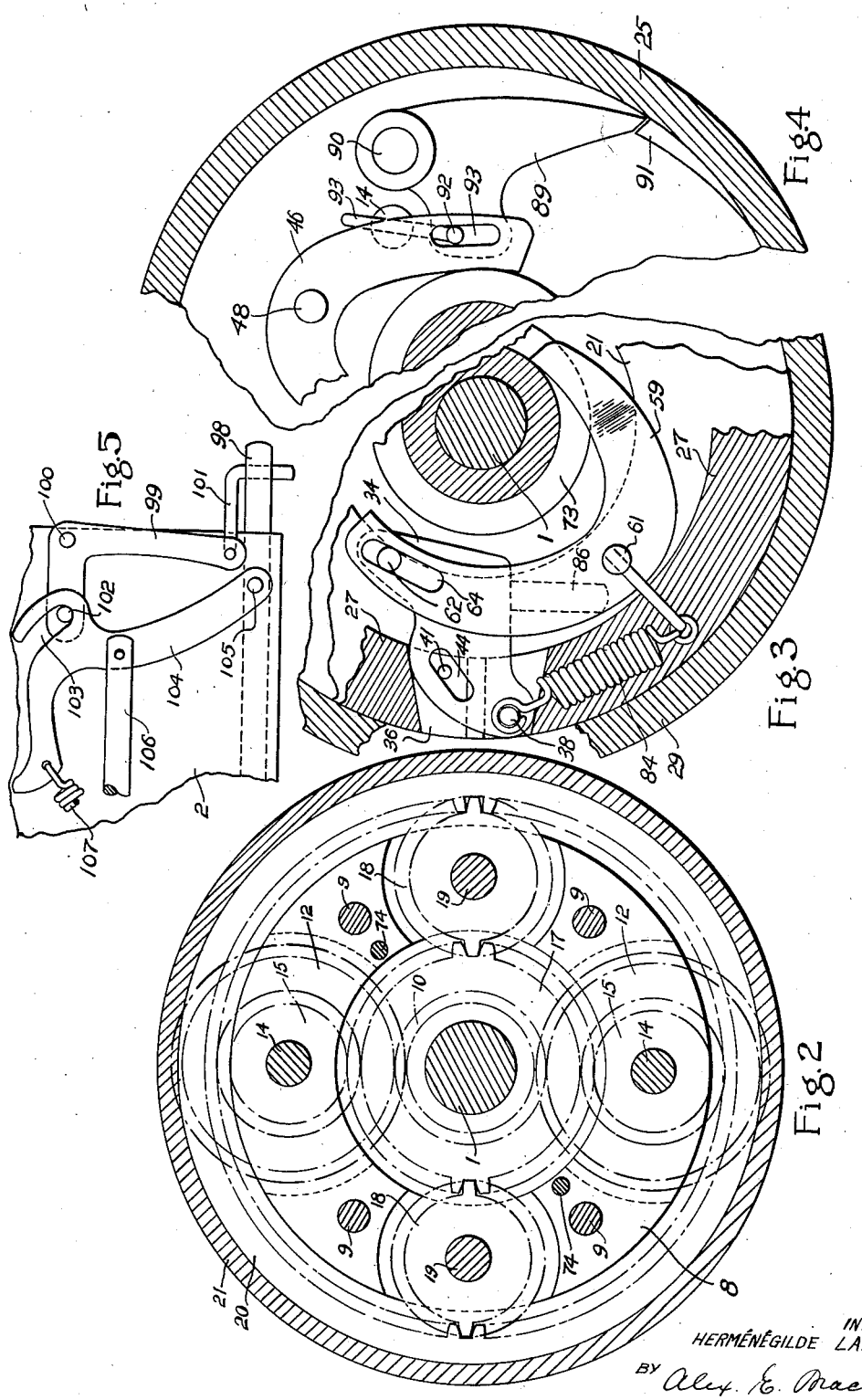
INVENTOR:
HERMÉNÉGILDE LAFLECHE
BY Alex. E. MacRae
ATTORNEY.

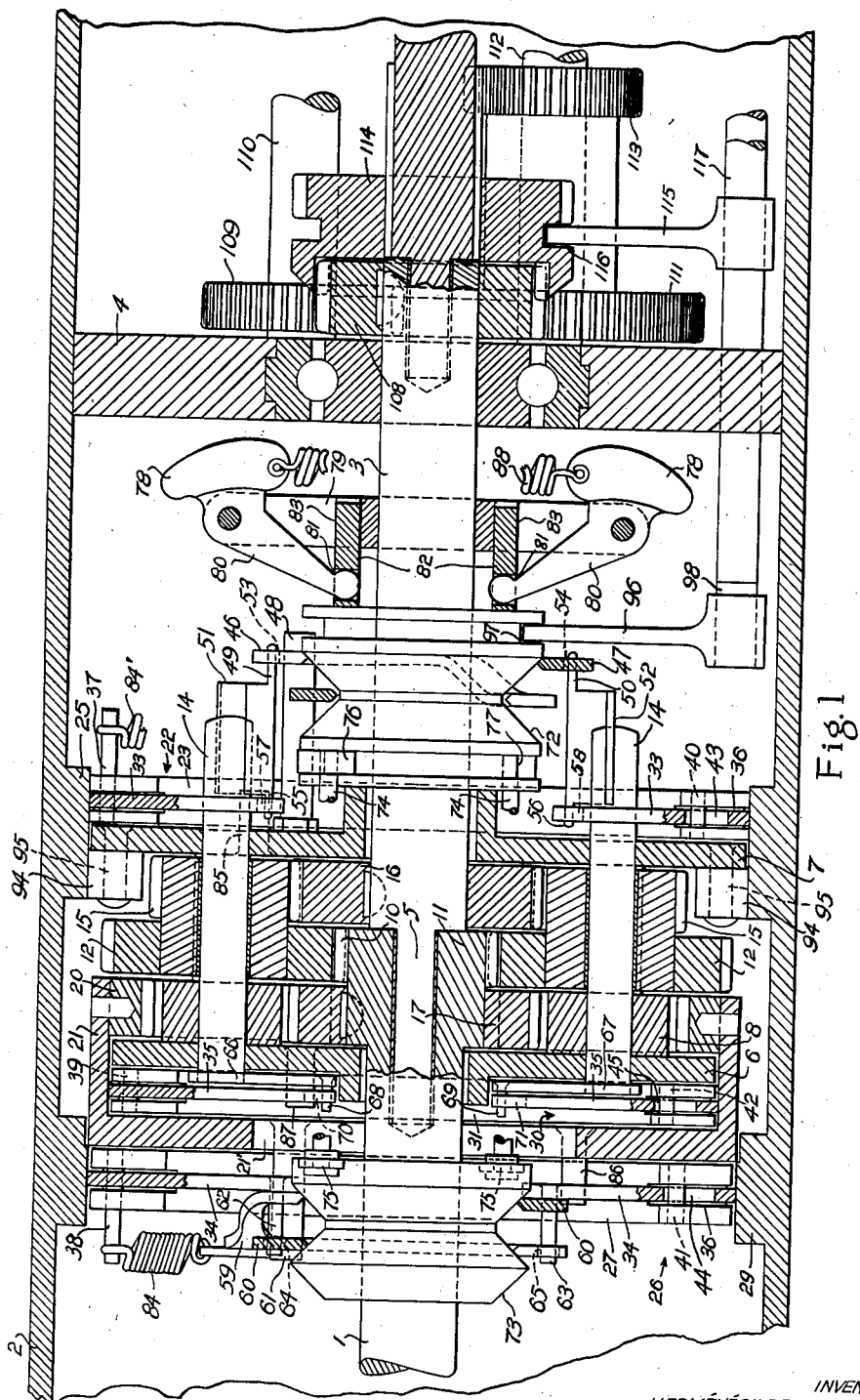

Patented Aug. 1, 1939

2,167,953

UNITED STATES PATENT OFFICE 2,167,953

TRANSMISSION MECHANISM

Herménégilde Lafleche, Casselman, Ontario, Canada

Application July 27, 1937, Serial No. 155,866

18 Claims. (Cl. 74—260)

This invention relates to transmission mechanisms, and more particularly to an automatic variable speed transmission.

An object of the invention is to provide a transmission mechanism adapted for application to power driven vehicles in which the speed changes are made in accordance with the speed of the driven shaft and in which actuating means are provided for establishing the mechanism in each speed ratio, the force applied to said actuating means being directly proportional to the load of the driven shaft.

Another object is to provide a transmission in which centrifugal weights are employed to release the actuating means for one speed ratio and to place the actuating means for the following speed ratio in position whereby an actuating force may be applied thereto.

Another object is to utilize a revolvable spider and planetary gear assembly in a transmission and a ring gear associated therewith in such manner that in high speed ratio, the entire mechanism revolves as a rigid unit with no relatively rotating gears.

Another object is to provide a transmission which may be manually controlled at every stage thereof.

Another object is to provide a transmission the parts of which function actively and normally in a lubricating bath.

Further objects will appear from the accompanying drawings, in which,

Figure 1 is a vertical longitudinal sectional view of the improved transmission showing the transmission in its normal at rest position, Figure 2 is a view of the planetary gear system employed, Figure 3 is a view of one of the clutch or brake arrangements, Figure 4 is a view of a substitute arrangement for the clutch and brake shown in Figure 1, and Figure 5 is a view of a manual control means for the transmission.

Referring to the drawings, I is the driving shaft rotatably mounted in the transmission housing 2 by means of a front bearing (not shown) and 3 is the driven shaft rotatably mounted in the housing 2 by centre bearing 4 and rear bearing (not shown) and in alignment with the driving shaft 1, a forward extension 5 on the driven shaft extending into the driving shaft as shown.

The three speeds are built into one unit of the planetary type, all the gears being enclosed between two circular plates 6 and 7 to form a compact spider and gear assembly, the plates being spaced from one another by a spacer block 8 and bolted together by bolts 9, plate 6 being somewhat forward and plate 7 being somewhat rearward of the junction of the driving and driven shafts, axial bores being provided in each plate for the passage therethrough of the respective shafts. The spacer block 8 has suitable cut away portions as shown to accommodate the various gears. The spider with enclosed gears will hereinafter be referred to as the gear assembly.

The gear unit includes a small gear 10 formed on an enlarged portion 11 of the driving shaft and meshing with a pair of gears 12 rotatably mounted on pins 14 supported in plates 6 and 7 and block 8. Each of the gears 12 is provided with a smaller twin gear 15 which meshes with a gear 16 keyed to the driven shaft. Adjacent the small gear 10 is keyed a larger gear 17 on the portion 11 of the driving shaft meshing with a pair of gears 18 rotatably mounted on pins 19 supported in the plates 6 and 7 and block 8. Gears 18 also mesh with a ring gear 20 secured to the inner surface of a cylindrical drum 21 having a relatively large axial opening 21'.

In operation of the gear unit thus far described, rotation of the driving shaft causes counter clockwise revolution of the gear assembly through gears 10 and 12, the driven shaft being stationary under its load, and counter clockwise revolution of the ring gear 20 through gears 17 and 18. It will be observed that, if revolution of the gear assembly is stopped, energy will be transmitted, through rotation of gears 10, 12, 15 and 16, from the driving to the driven shafts, these gears being adapted to impart first or low speed to the driven shaft at a ratio of, say, 1 to 3.

Means are thus provided for stopping revolution of the gear assembly. This comprises a brake 22 mounted on the rear surface of plate 7 and having a pair of floating brake shoes 23 adapted to be expanded, in a manner to be described later, into engagement with the inner surface of a ring band 25 formed on the inside of the housing 2.

It will also be observed that, if revolution of ring gear 20 is stopped, a clockwise rotating movement will be imparted to the gear assembly (brake 22 being released) through gears 17 and 18 at a ratio of, say, 1 to 3. Thus, gears 10, 12, 15 and 16 will be compelled to double their speed to impart second or intermediate speed to the driven shaft.

Means for stopping revolution of the ring gear 20 comprises a brake 26 mounted on the front surface of the drum 21 and having a pair of floating brake shoes 27 adapted to be expanded into engagement with the inner surface of a ring band 29 formed on the inside of housing 2.

To attain direct drive or high speed, the gear assembly and the drum 21 are locked into a rigid unit which will rotate at the speed of the driving shaft. To accomplish locking of the gear assembly to the drum (brakes 22 and 26 being released), a clutch 30 is disposed within drum 21 and mounted on the front surface of plate 6. This clutch 30 also has a pair of floating clutch shoes 31 adapted to be expanded into engagement with the inside surface of drum 21.

Operation of each of the brakes 22, 26 and clutch 30 takes place in a similar manner and is permitted by means of respective pairs of cam levers 33, 34 and 35 which project into corresponding grooves 36 in each adjacent pair of brake or clutch shoe ends. Each lever is pivoted to a respective shoe end, as by pins 37, 38 and 39, and has a sliding pivotal engagement with the respective adjacent shoe end by means of pins 40, 41 and 42 on the shoe end, which pins project through slots 43, 44 and 45 in the cam levers. As illustrated in Figure 3, counter clockwise movement of the cam levers about their pivots will expand the respective shoes whereas clockwise movement will contract the shoes.

Means for imparting movement to the cam levers 33 includes respective horse shoe arms 46 and 47 pivoted for rocking movement to pins 48, which may, for instance, be extensions of bolts 9. Rearwardly extending arms 49, 50 on crank arms 51, 52 mounted on projecting ends of pins 14 pass through slots 53, 54 in one leg of the horse shoe arms 46, 47 for sliding pivotal engagement therewith. Forwardly extending arms 55, 56 on crank arms 51, 52 project through slots 57, 58 in levers 33 for sliding pivotal engagement therewith.

Movement of cam levers 34 is effected through respective horse shoe arms 59, 60 pivoted for rocking movement to pins 61 carried by drum 21, one leg of each horse shoe arm having sliding pivotal engagement with its related lever 34 by means of pins 62, 63 mounted thereon and extending through slots 64, 65 in the respective legs of the horse shoe arms.

Movement of cam levers 35 is effected through rocking movement of the aforesaid horse shoe arms 46, 47 which, through crank arms 51, 52 rotate pins 14 to swing arms 66, 67 keyed to the ends of pins 14, arms 66, 67 having sliding pivotal engagement with cam levers 35 by means of pins 68, 69 mounted on arms 66, 67 and extending through slots 70, 71 in levers 35.

Rocking movement is imparted to horse shoe arms 46, 47 and 59, 60 by means of cam 72, carried by the driven shaft, and cam 73, carried by the driving shaft, respectively, said cams having opposed conical surfaces for engagement with ends of the legs of the horse shoe arms. It will be noted that the side edges of said legs are bevelled for bearing engagement with said conical surfaces. It will also be noted that one leg of each horse shoe arm is curved out of the plane of the other leg. Thus, axial movement of the cams will cause a rocking movement of the horse shoe arms depending upon the direction and extent of the axial movement. It will be noted that the axial bore 21' in drum 21 is sufficiently large to permit passage of cam 73.

Cams 72 and 73, which are necessarily widely separated, are however connected to each other for simultaneous movement. Such connection comprises two rods 74, one end of each of which is held in projecting eyes 75 on cam 73 and the other end of each of which is secured to forks 76 slidable in a groove 77 provided in cam 72.

Axial movement is imparted to cams 72, 73 in accordance with the speed of the driven shaft by means of centrifugal weights 78 which are pivoted to a frame member 79 keyed to driven shaft 3. Lever arms 80 actuated by the weights 78 have bearing engagement with grooves 81 in rearward extensions 82 of cam 72, the ends of extensions 82 sliding in grooves 83 in the frame member 79.

It should be stated that actuation of the various cam levers by means of the horse shoe arms and cams does not act to apply the various brakes and clutch but merely to place such levers in position for subsequent actuation to expand the shoes and also for withdrawing the levers from expanding engagement with the shoes to disengage the brake or clutch and maintain it in that position until again actuated. Initial engagement of the brake or clutch shoes with the opposing surfaces is chiefly effected through the centrifugal force acting on such shoes. However, in brakes 22 and 26, springs may be provided to aid such initial engagement. As shown in Figure 3, relating to brake 26, a spring 84 is secured at one end to pin 38 on shoe 27 and at the other end to an arm fixed to pin 61, the said spring acting to urge expanding movement of the shoe 27. A similarly positioned spring 84' may be mounted in association with brake 22. No spring will generally be required in association with clutch 30 since the increased speed of rotation will exert sufficient centrifugal force to initially expand the clutch shoes.

Force is exerted, in a manner to be now described, on the cam levers 33, 34, 35 to expand the respective shoes by means of respective pairs of projections 85, 86, 87 mounted, respectively, on the rear face of plate 7, on the front face of drum 21 and on the front face of plate 6.

In the normal at rest position of the transmission, as shown in Figure 1, cam levers 34 and 35 are in position to maintain brake 26 and clutch 30 in disengaged position while cam levers 33 are in their engaging position, shoes 23 being free to expand. Centrifugal force, aided preferably by a spring 84', initially expands shoes 23 into engagement with ring band 25 which stops rotary movement of the shoes. Projections 85 on plate 7 of the gear assembly, which is revolving in a counter clockwise direction, immediately engage the cam levers 33 and apply a pressure thereon to expand the shoes directly in accordance with the load of the driven shaft.

As the speed of the driven shaft increases, the centrifugal weights 78 move outwardly to impart rearward axial movement to cams 72 and 73. Initial rearward movement simultaneously rocks horse shoe arms 46, 47 and 59, 60 to unlock brake 22 and to permit brake 26 to lock. Centrifugal force, aided by spring 84 initially expands brake shoes 27 to stop rotary movement thereof and projections 86 immediately engage cam levers 34 to apply a pressure thereon, also directly in accordance with the load on the driven shaft.

Further rearward movement of the cams 72 and 73 again simultaneously rocks horse shoe arms 46, 47 and 59, 60 to unlock brake 26 and to permit clutch 30 to lock (brake 22 remaining in unlocked position). Clutch 30 locks in the same manner as brakes 22 and 26 by means of projections 87, the pressure thereof being, as in the case of the brakes, directly in accordance with the load of the driven shaft.

The centrifugal weights 78 may be connected as by a spring 88 to aid in bringing the cam mechanism to its normal at rest position.

Figure 4 illustrates an arrangement which may be substituted for one or more of the brakes 22, 26, and clutch 30. Two dogs 89 (only one of which is shown) may be freely mounted on pins 90 mounted in, for example, plate 7, for engagement with ratchet teeth 91 on ring band 25. Dog 89 has sliding pivotal engagement with horse shoe arm 46 by means of a pin 92 on the dog extending through a slot 93 in one leg of horse shoe arm 46, the pin 92 also being connected to pin 14 by an arm 93. The dogs 89 are actuated by rotation of pins 14 as by crank arms 51, 52.

An intermediate supporting means for the transmission may be provided by rollers 94 pivotally mounted by pins 95 on plate 7, the rollers having bearing engagement with the ring band 25.

A manual control of cams 72 and 73 may be provided and comprises a yoke 96 having sliding engagement with a groove 97 in cam 72 and to which is secured a rod 98 which extends through the end of housing 2 as shown in Figure 5. A lever 99 pivoted to the outside of housing 2 at 100 has engagement with the projecting end of rod 98 by means of a hook 101 at one end thereof. At the other end of lever 99 a roller 102 is provided for engagement with a curved groove 103 in a second lever 104 pivoted to the housing 2 at 105. Lever 104 is connected to the clutch pedal, for instance, of the vehicle as by means of a link 106. A spring 107 secured to lever 104 serves to return the same to normal position. Pressing the clutch pedal in to, say, ¾ of an inch, will move rod 98 rearwardly to place the cam mechanism in say low speed position. Pressing the pedal to say, ⅜ of an inch, will move the cam mechanism to second speed position. Automatic speed control is unaffected by the manual control since the roller 102 may readily move in the curved groove 103.

Reverse gearing may be of the usual type and, as shown, comprises a gear 108 keyed to the driven shaft and meshing with a gear 109 mounted on a shaft 110. Gear 109 meshes with gear 111 on shaft 112, a gear 113 also rotating on shaft 112 with gear 111. A gear 114 is splined for movement on a portion 118 of driven shaft 3. Movement of gear 114 into mesh with gear 108, for forward movement, into mesh with gear 113 for reverse movement, or into neutral position may be effected by a yoke 115 sliding in a groove 116 of gear 114, a shifter rod 117 being secured to yoke 115. Any suitable connection of the rod 117 with the driver's compartment of the vehicle may be provided. It will be apparent that the three speed transmission described will also function in the reverse position of the gearing.

The housing 2 is adapted to contain a bath of lubricant since the particular arrangement of brake and clutch described enable the latter to function actively and normally when operating in oil, thus simplifying the construction and eliminating wear.

In certain types of transmission arrangements it might be advisable to attain the speed ratio changes in accordance with the speed of the driving shaft. It will be obvious that a mere reversal of the centrifugal weights and cams will accomplish such a purpose.

I claim:

1. In an automatic transmission, having a driving shaft, a driven shaft, a gear on the driving shaft and a gear on the driven shaft, a planetary gear assembly meshing with both said gears and revolvable in a direction opposite to the direction of rotation of the driving shaft, a second gear on the driving shaft, an annular gear, planet gears meshing with said second gear and annular gear, said annular gear being revolvable in direction opposite to the direction of rotation of the driving shaft, means for establishing driving connections between said shafts at variable speed ratios comprising successively actuated means for stopping revolution of the gear assembly, stopping revolution of the annular gear, and clutching said annular gear to the gear assembly.

2. In an automatic transmission, having a driving shaft, a driven shaft, a gear on the driving shaft and a gear on the driven shaft, a planetary gear assembly meshing with both said gears and revolvable in a direction opposite to the direction of rotation of the driving shaft, a second gear on the driving shaft, an annular gear, planet gears meshing with said second gear and annular gear, said annular gear being revolvable in direction opposite to the direction of rotation of the driving shaft, means for establishing driving connections between said shafts at variable speed ratios comprising successively actuated means for stopping revolution of the annular gear to cause revolution of the gear assembly in the same direction as the direction of rotation of the driving shaft, and clutching said annular gear to the gear assembly to cause rotation of the annular gear, gear assembly, and driven shaft as a unit with the driving shaft.

3. In an automatic transmission having a driving shaft, a driven shaft and a revolvable planetary gear assembly connecting said shafts, a revolvable annular gear having an independent gear connection with the driving shaft, members controlling the revolution of the gear assembly and annular gear to connect the shafts in variable speed ratios, cams controlling said members, and centrifugal weight means for actuating said cams.

4. In an automatic transmission having a driving shaft, a driven shaft and a revolvable planetary gear assembly connecting said shafts, a revolvable annular gear having an independent gear connection with the driving shaft, successively actuable members for stopping revolution of the gear assembly, for stopping revolution of the annular gear and for clutching the annular gear to the gear assembly, means for applying an actuating force to said members said force being directly proportional to the load on the driven shaft.

5. In an automatic transmission, having a driving shaft, a driven shaft, and a revolvable planetary gear assembly connecting said shafts, a revolvable annular gear having an independent gear connection with the driving shaft, successively actuatable members for stopping revolution of the gear assembly, for stopping revolution of the annular gear and for clutching the annular gear to the gear assembly, interconnected cams slidable on the shafts for operating said members to place the same in non-actuating and actuating position, centrifugal weights for imparting sliding movement to said cams, means exerting an actuating force on said members when in actuating position, said force being directly proportional to the load on the driven shaft.

6. In an automatic transmission, having a driving shaft, a driven shaft and planetary gears connecting said shafts, a revolvable carrier for said gears, a revolvable annular gear having an independent gear connection with said driving shaft, successively actuatable members for stopping revolution of the carrier, for stopping revolution of the annular gear and for clutching said annular gear to the carrier, means for positioning said members in non-actuating and actuating position, centrifugal means for operating said positioning means, and means applying an actuating force to said members, said force being directly proportional to the load on the driven shaft.

7. In an automatic transmission, having a driving shaft, a driven shaft, and a planetary gear assembly adapted to form a driving connection between said shafts, an annular gear having an independent gear connection with said driving shaft, said driving shaft imparting revolution to said gear assembly and annular gear in a direction opposite to the direction of rotation of the driving shaft, and means for establishing driving connections between said shafts at variable speed ratios comprising successively actuated means for stopping revolution of the gear assembly, for stopping revolution of the annular gear to cause revolution of the gear assembly in the same direction as the direction of rotation of the driving shaft, and for clutching said annular gear to the gear assembly to cause rotation of the annular gear, gear assembly and driven shaft as a unit with the driving shaft.

8. In an automatic transmission, having a driving shaft, a driven shaft, and a revolvable planetary gear assembly connecting said shafts, a revolvable annular gear having an independent gear connection with the driving shaft, successively actuatable means for stopping revolution of the gear assembly, for stopping revolution of the annular gear and for clutching the annular gear to the gear assembly comprising, respectively, a pair of friction shoes, a cam lever for actuating said shoes, U-shaped arms pivoted for rocking movement for operating said cam lever, cams slidably mounted on said shafts for rocking said arms, means responsive to the speed of the driven shaft for sliding said cams to rock said arms, and means adapted to apply a force to said cam lever when in actuating position, said force being directly proportional to the load on the driven shaft.

9. In an automatic transmission having a driving shaft, a driven shaft, and a revolvable planetary gear assembly connecting said shafts, a revolvable annular gear having an independent gear connection with the driving shaft, successively actuatable means for stopping revolution of the gear assembly, for stopping revolution of the annular gear and for clutching the annular gear to gear assembly comprising, respectively, a pair of ratchet dogs, U-shaped arms pivoted for rocking movement for operating said dogs, cams slidably mounted on said shafts for rocking said arms, and means responsive to the speed of the driven shaft for sliding said cams to rock said arms.

10. In an automatic transmission having a driving shaft, a driven shaft, and a revolvable planetary gear assembly connecting said shafts, a revolvable annular gear having an independent gear connection with the driving shaft, successively actuatable members for stopping revolution of the gear assembly, for stopping revolution of the annular gear and for clutching the annular gear to the gear assembly, and means responsive to the speed of the driven shaft for placing said members in non-actuating and actuating position.

11. In an automatic transmission having a driving shaft, a driven shaft, and a revolvable planetary gear assembly connecting said shafts, a revolvable annular gear having an independent gear connection with the driving shaft, successively actuatable members for stopping revolution of the gear assembly, for stopping revolution of the annular gear and for clutching the annular gear to the gear assembly, and means responsive to the speed of the driven shaft for placing said members in non-actuating and actuating position and manual means for placing said members in non-actuating and actuating position, said manual means being operative irrespective of the position of said speed responsive means.

12. In an automotive vehicle, a transmission comprising a driving shaft, a driven shaft and a revolvable planetary gear assembly connecting said shafts, a revolvable annular gear having an independent gear connection with the driving shaft, successively actuatable members for stopping revolution of the gear assembly, for stopping revolution of the annular gear and for clutching the annular gear to the gear assembly, means responsive to the speed of the driven shaft for placing said members in non-actuating and actuating position, and manual means operable for placing said members in non-actuating and actuating position, said manual means being operative irrespective of the position of said speed responsive means.

13. In an automatic transmission having a driving shaft, a driven shaft and a planetary gear assembly adapted to form driving connections between said shafts at variable speed ratios, an annular gear, said annular gear and gear assembly each having an independent gear connection with the driving shaft and a common gear connection with the driven shaft.

14. In an automatic transmission having a driving shaft, a driven shaft and a planetary gear assembly adapted to form driving connections between said shafts at variable speed ratios, a revolvable carrier for said gear assembly, and a revolvable annular gear mounted on said carrier, said annular gear and carrier each having an independent gear connection with the driving shaft and a common gear connection with the driven shaft.

15. In an automatic transmission having a driving shaft, a driven shaft and a planetary gear assembly adapted to form connections between said shafts at variable speed ratios, a carrier for said gear assembly, an annular gear mounted on said carrier, and independent gear connections between said carrier and the driving shaft and between said annular gear and the driving shaft.

16. In an automatic transmission having a driving shaft, a driven shaft and a planetary gear assembly adapted to form connections between said shafts at variable speed ratios, a carrier for said gear assembly, gear connections between said carrier and the driving and driven shafts, an annular gear mounted on said carrier, and a gear connection between said annular gear and the driving shaft, said gear connections being arranged to cause revolution of said carrier and annular gear about the driving shaft at different speed ratios and in a direction opposite to the direction of rotation of the driving shaft.

17. In an automatic transmission having a driving shaft, a driven shaft and a planetary gear assembly adapted to form connections between said shafts at variable speed ratios, a carrier for said gear assembly, gear connections between said carrier and the driving and driven shafts, an annular gear mounted on said carrier, a gear connection between said annular gear and the driving shaft, said gear connections being arranged to cause revolution of said carrier and annular gear about the driving shaft at different speed ratios and in a direction opposite to the direction of rotation of the driving shaft, means for arresting revolution of the carrier to impart rotative movement to the driven shaft through said first mentioned gear connections, means for arresting revolution of the annular gear to cause revolution of the carrier in the same direction as the direction of rotation of the driving shaft, and means for clutching the annular gear to the carrier to cause rotation of the annular gear, carrier and driven shaft as a unit with the driving shaft.

18. In an automatic transmission having a driving shaft, and a driven shaft, a planetary gear assembly adapted to form driving connections between said shafts at variable speed ratios, an annular gear, said annular gear and gear assembly each having an independent and constant gear connection with the driving shaft and being revolvable by means of said respective gear connections in a direction opposite to the direction of rotation of the driving shaft, and successively actuated means for stopping revolution of the gear assembly, for stopping revolution of the annular gear, and for clutching said annular gear to the gear assembly.

HERMÉNÉGILDE LAFLECHE.